United States Patent
Hung et al.

(10) Patent No.: US 8,400,115 B2
(45) Date of Patent: Mar. 19, 2013

(54) CHARGE DEVICE, ELECTRONIC DEVICE AND CHARGE METHOD THEREOF

(75) Inventors: Chien-Pang Hung, Taipei (TW); Chih-Chieh Hu, Taipei (TW); Chiu-Yuan Lin, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 315 days.

(21) Appl. No.: 12/851,548

(22) Filed: Aug. 5, 2010

(65) Prior Publication Data

US 2011/0115443 A1 May 19, 2011

(30) Foreign Application Priority Data

Nov. 13, 2009 (TW) .............................. 98138643 A

(51) Int. Cl.
*H02J 7/04* (2006.01)
*H02J 7/06* (2006.01)
(52) U.S. Cl. ......................... 320/162; 320/164; 320/165
(58) Field of Classification Search .................. 320/162, 320/164, 165
See application file for complete search history.

(56) References Cited

U.S. PATENT DOCUMENTS

| 5,764,035 A | * | 6/1998 | Lee | 320/160 |
| 2002/0027786 A1 | * | 3/2002 | Nakazawa et al. | 363/21.05 |
| 2005/0017676 A1 | * | 1/2005 | Takimoto et al. | 320/107 |
| 2007/0222420 A1 | * | 9/2007 | Nishida et al. | 320/162 |

OTHER PUBLICATIONS

"Office Action of Taiwan Counterpart Application", issued on Nov. 8, 2012, p. 1-p. 6.

* cited by examiner

*Primary Examiner* — M'Baye Diao
(74) *Attorney, Agent, or Firm* — Winston Hsu; Scott Margo

(57) ABSTRACT

A charge device is provided. The charge device includes a charge interface, a voltage detector and a control circuit. The charge interface receives a first power and provides a charge power to charge a rechargeable device accordingly. The voltage detector detects a charge voltage of the rechargeable device. The control circuit is respectively coupled to the charge interface and the voltage detector. When the charge voltage is smaller than a predetermined voltage, the control circuit makes the charge voltage and a charge current of the charge power to present a proportional relation. An electronic device and a charge method are also provided.

30 Claims, 6 Drawing Sheets

CHARGE DEVICE, ELECTRONIC DEVICE AND CHARGE METHOD THEREOF

CROSS-REFERENCE TO RELATED APPLICATION

This application claims the priority benefit of Taiwan application serial no. 98138643, filed on Nov. 13, 2009. The entirety of the above-mentioned patent application is hereby incorporated by reference herein and made a part of this specification.

BACKGROUND

1. Field of the Invention

The present invention relates to a charge device, an electronic device and a charge method. More particularly, the present invention relates to a charge device, an electronic device and a charge method capable of controlling the charge current.

2. Description of Related Art

Mobile devices have changed life styles of people around the world, and in nowadays, almost everyone has a portable mobile device, for example, a personal digital assistant (PDA), a global positioning system (GPS), a notebook, a netbook or a mobile phone, etc. The portable mobile device generally includes a rechargeable device used for providing power to the mobile device.

The portable mobile devices are developed to have design features of lightness, slimness, shortness and smallness. Therefore, a rechargeable device with a light weight, a small size and a high power storage capacity is particularly important. Moreover, besides the requirements of small size and high power storage capacity, a charge device that affects the lifespan of the rechargeable device and user's safety is also significantly important.

The lower the voltage of the rechargeable device is, the higher the charge current output by the conventional charge device is. However, when the rechargeable device is abnormal or in malfunction, the voltage of the rechargeable device can be excessively low, and now if a large current is used to charge the rechargeable device, not only a power charging effect cannot be achieved, but also the rechargeable device can be damaged due to overheating, or even exploded to raise a safety concern.

SUMMARY

The invention is directed to a charge device, an electronic device and a charge method, which may avoid damage or explosion of a rechargeable device caused by overheating, and may complete charging the rechargeable device that is temporarily over-discharged.

The invention provides an electronic device including a rechargeable device and a charge device.

The invention provides a charge device. The charge device includes a charge interface, a voltage detector and a control circuit. The charge interface receives a first power and provides a charge power to charge a rechargeable device accordingly. The voltage detector detects a charge voltage of the rechargeable device. The control circuit is coupled to the charge interface and the voltage detector. When the charge voltage is smaller than a predetermined voltage, the control circuit makes the charge voltage and a charge current of the charge power to present a proportional relation.

In an embodiment of the invention, the control circuit makes the charge voltage and the charge current to present a piece-wise linear relation.

In an embodiment of the invention, the charge device further includes a current detector coupled to the charge interface and the control circuit for detecting a first current of the first power, wherein the control circuit adjusts the proportional relation according to the first current.

In an embodiment of the invention, the control circuit includes an AND gate, a low-voltage control and pulse width modulation (PWM) generator and a PWM generator. The AND gate is coupled to the charge interface, and outputs a first PWM signal to the charge interface according to a second PWM signal and a third PWM signal. The low-voltage control and PWM generator is coupled to the AND gate and the voltage detector, and decreases a duty cycle of the third PWM signal when the charge voltage is smaller than the predetermined voltage. The PWM generator is coupled to the AND gate, the current detector and the voltage detector, and adjusts a duty cycle of the second PWM signal according to the charge voltage and the first current.

In an embodiment of the invention, the charge interface includes a transformer, a first capacitor, a second capacitor, a third capacitor and a first Schottky diode. A first terminal of the transformer is coupled to ground, a second terminal of the transformer is coupled to a first end of the first capacitor and a first end of the first Schottky diode, a second end of the first capacitor is coupled to a fourth terminal of the transformer, a third terminal of the transformer is coupled to a first end of the second capacitor, a second end of the second capacitor is coupled to ground, a second end of the first Schottky diode is coupled to a first end of the third capacitor, a second end of the third capacitor is coupled to ground, and the first end of the third capacitor is coupled to a first terminal of the rechargeable device.

In an embodiment of the invention, the current detector includes a current detecting module, a first resistor, a second resistor and a third resistor. The first resistor is coupled to a third terminal and a fourth terminal of the current detecting module, a first end of the second resistor is coupled to a first terminal of the current detecting module, a first end of the third resistor is coupled to the first terminal of the current detecting module, a second end of the third resistor coupled to ground, a second terminal of the current detecting module is coupled to ground, the third terminal of the current detecting module is coupled to a fifth terminal of the current detecting module, the fourth terminal of the current detecting module is coupled to the first end of the second resistor, and the fifth terminal of the current detecting module receives the first power.

In an embodiment of the invention, the control circuit includes a control module and a fourth capacitor. A first terminal and a second terminal of the control module are coupled to the fifth terminal of the current detecting module. The fourth capacitor is coupled to a third terminal and a fourth terminal of the control module, the fourth terminal of the control module is coupled to the second end of the second resistor, a seventh terminal of the control module is coupled to ground, and an eighth terminal of the control module is coupled to the fourth terminal of the transformer.

In an embodiment of the invention, the voltage detector includes a low-voltage detecting module and a high-voltage detecting module. The low-voltage detecting module includes a fourth resistor and a fifth resistor. A first end of the fourth resistor is coupled to the first terminal of the rechargeable device, a second terminal of the fourth resistor is coupled to a sixth terminal of the control module and a first end of the fifth resistor, and a second end of the fifth resistor is coupled to ground. The high-voltage detecting module includes a sixth resistor and a first Zener diode. A first end of the sixth resistor is coupled to a second end of the fourth capacitor, a second end of the sixth resistor is coupled to a first end of the first Zener diode, and a second end of the first Zener diode is coupled to the first terminal of the rechargeable device.

In an embodiment of the invention, the charge device further includes a voltage protection module including a seventh resistor and an eighth resistor. A first end of the seventh resistor is coupled to the fifth terminal of the current detecting module, a second end of the seventh resistor is coupled to a fifth terminal of the control module and a first end of the eighth resistor, and a second end of the eighth resistor is coupled to ground.

In an embodiment of the invention, the current detector includes a first resistor. A first end of the first resistor is coupled to the first end of the second capacitor, and a second end of the first resistor receives the first power.

In an embodiment of the invention, the control circuit includes a control module, a fourth capacitor, a second resistor and a third resistor. A first terminal of the control module is coupled to the second end of the first resistor, a second terminal of the control module is coupled to the first end of the first resistor. The fourth capacitor is coupled to a fourth terminal and a fifth terminal of the control module. The second resistor is coupled to a third terminal and the fourth terminal of the control module. A first end of the third resistor is coupled to the third terminal of the control module, and a second end of the third resistor is coupled to ground. A seventh terminal of the control module is coupled to ground, and an eighth terminal of the control module is coupled to the fourth terminal of the transformer.

In an embodiment of the invention, the voltage detector includes a fourth resistor and a fifth resistor. A first end of the fourth resistor is coupled to the first terminal of the rechargeable device, a second end of the fourth resistor is coupled to a sixth terminal of the control module and a first end of the fifth resistor, and a second end of the fifth resistor is coupled to ground.

In an embodiment of the invention, the first power is an alternating current power or a direct current power.

In an embodiment of the invention, the charge interface has a universal serial bus (USB) interface for receiving the first power.

The invention provides a charge method. The charge method can be described as follows. A charge interface is provided to receive a first power, so as to provide a charge power to charge a rechargeable device accordingly. A voltage detector is provided to detect a charge voltage of the rechargeable device. A control circuit is provided to make the charge voltage and a charge current of the charge power to present a proportional relation when the charge voltage is smaller than a predetermined voltage.

In an embodiment of the invention, the charge method further comprises making the charge voltage and the charge current to present a piece-wise linear relation through the control circuit.

According to the above descriptions, the invention provides a charge device, an electronic device and a charge method. In allusion to abnormity and malfunction of the rechargeable device, when the voltage detector detects that the charge voltage is smaller than the predetermined voltage, the control circuit limits the charge current. Therefore, utilization of the charge device can avoid damage or explosion of the rechargeable device caused by overheating. On the other hand, regarding a temporary over-discharge of the rechargeable device, when the voltage detector detects that the charge voltage is smaller than the predetermined voltage, the control circuit limits the charge current. The charge device has a chance to recover the charge voltage to a voltage level greater than the predetermined voltage, and then the rechargeable device is charged according to a general charge method.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
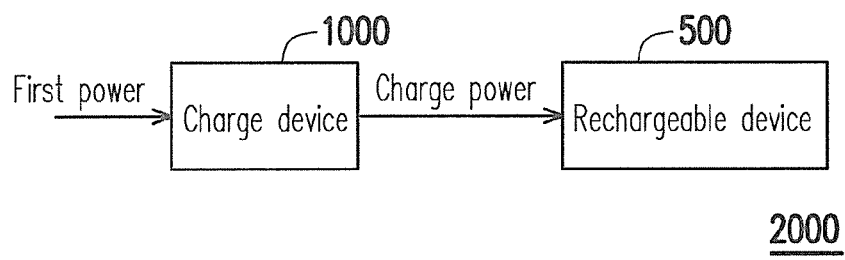
FIG. 1 is a block diagram illustrating an electronic device according to an embodiment of the invention.
Figure 2:
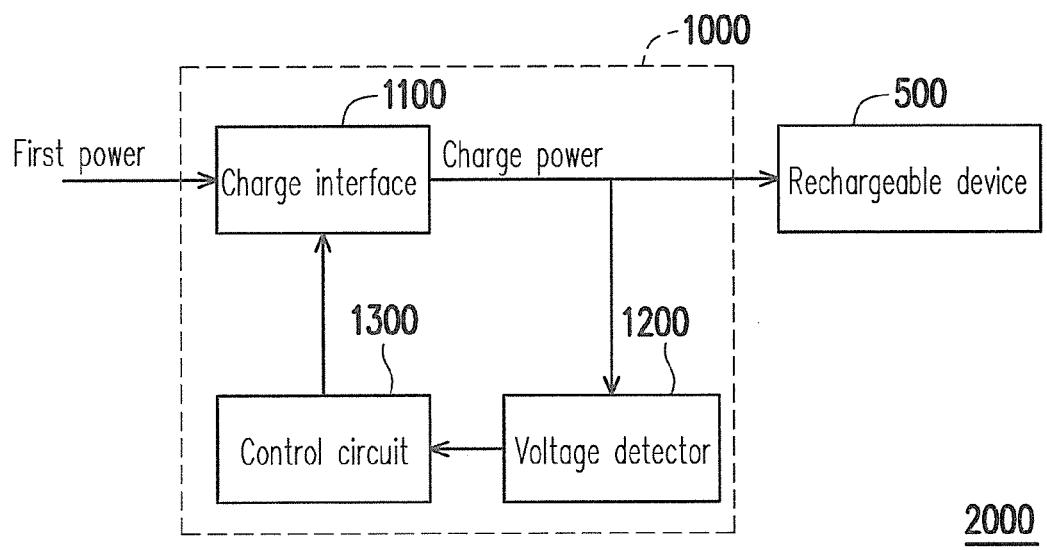
FIG. 2 is a block diagram illustrating a charge device according to an embodiment of the invention.

FIG. 1 is a block diagram illustrating an electronic device according to an embodiment of the invention. Referring to FIG. 1, the electronic device 2000 includes a rechargeable device 500 and a charge device 1000. The electronic device 2000 is, for example, a portable mobile device such as a mobile phone, a personal digital assistant (PDA), a multimedia player, a notebook, or a netbook, etc., but the invention is not limited thereto. FIG. 2 is a block diagram illustrating a charge device according to an embodiment of the invention. Referring to FIG. 2, the charge device 1000 includes a charge interface 1100, a voltage detector 1200 and a control circuit 1300. A first power may be an alternating current. The charge interface 1100 receives the first power and converts it into the direct current power, so as to provide a charge power to charge the rechargeable device 500. The voltage detector 1200 detects a charge voltage of the rechargeable device 500. The control circuit 1300 is respectively coupled to the charge interface 1100 and the voltage detector 1200. Similarly, the first power can also be a direct current. The charge interface 1100 receives and adjusts the first power, so as to provide a charge power to charge the rechargeable device 500. Wherein, the rechargeable device 500 may be a rechargeable battery.

Figure 3:
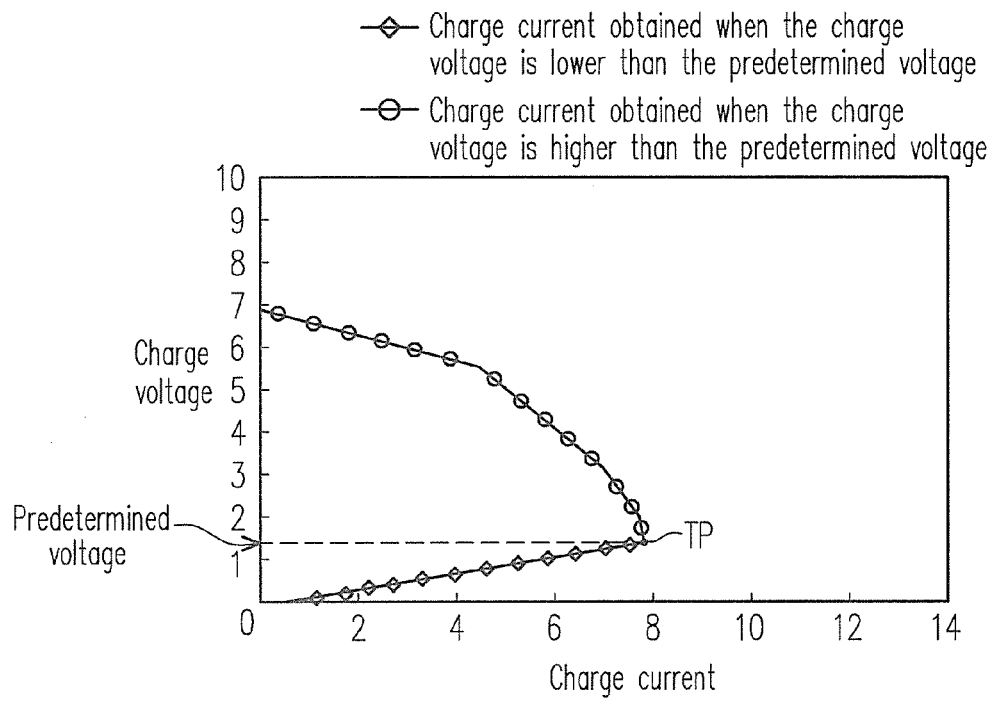
FIG. 3 is a diagram illustrating a relationship between a charge voltage and a charge current of a charge device according to an embodiment of the invention.

FIG. 3 is a diagram illustrating a relationship between a charge voltage and a charge current of a charge device according to an embodiment of the invention. Referring to FIG. 2 and FIG. 3, when the charge voltage is equal to a predetermined voltage, a point TP in FIG. 3 is a turning point. When the voltage detector 1200 detects that the charge voltage is lower than the predetermined voltage (which is about 1.2V in the present embodiment), the control circuit 1300 limits the charge current, and controls the charge voltage and the charge current of the charge power to present a proportional relation (a line below the point TP). Namely, the more the charge voltage decreases under the predetermined voltage, the lower the control circuit 1300 makes the recharge current. When the charge voltage is greater than the predetermined voltage, the rechargeable device 500 is charged by a general charge method (a line above the point TP).

The above predetermined voltage is about 1.2V, but the invention is not limited thereto, and the predetermined voltage can be any voltage level. Moreover, the rechargeable device 500 is generally a rechargeable battery. In addition, the charge interface 1100 may receive the first power that is a direct current power, and the charge interface 1100 may be a universal serial bus (USB) interface. It should be noticed that the control circuit 1300 can further make the charge voltage and the charge current to present a direct proportional or/and piece-wise linear relation.

In the embodiment of the invention, in accordance with the abnormity and malfunction of the rechargeable device 500, when the voltage detector 1200 detects that the charge voltage is lower than the predetermined voltage, the control circuit 1300 limits the charge current. The more the charge voltage decreases under the predetermined voltage, the lower the control circuit 1300 makes the recharge current. In this way, utilization of the charge device 1000 can avoid the damage or explosion of the rechargeable device 500 caused by overheating. On the other hand, in accordance with the temporary over-discharge of the rechargeable device 500, when the voltage detector 1200 detects that the charge voltage is lower than the predetermined voltage, the control circuit 1300 adjusts and limits the charge current. The charge interface 1100 charges the rechargeable device 500 by using a low current. The charge device 1000 may recover the charge voltage to be greater than the predetermined voltage, and then the rechargeable device 500 is charged by a general charge method.

In the embodiment of the invention, the electronic device 2000 uses the charge device 1000 to charge the rechargeable device 500, so as to avoid the damage or explosion of the rechargeable device 500 caused by overheating and to complete charging the rechargeable device 500 that is temporarily over-discharged.

Figure 4:
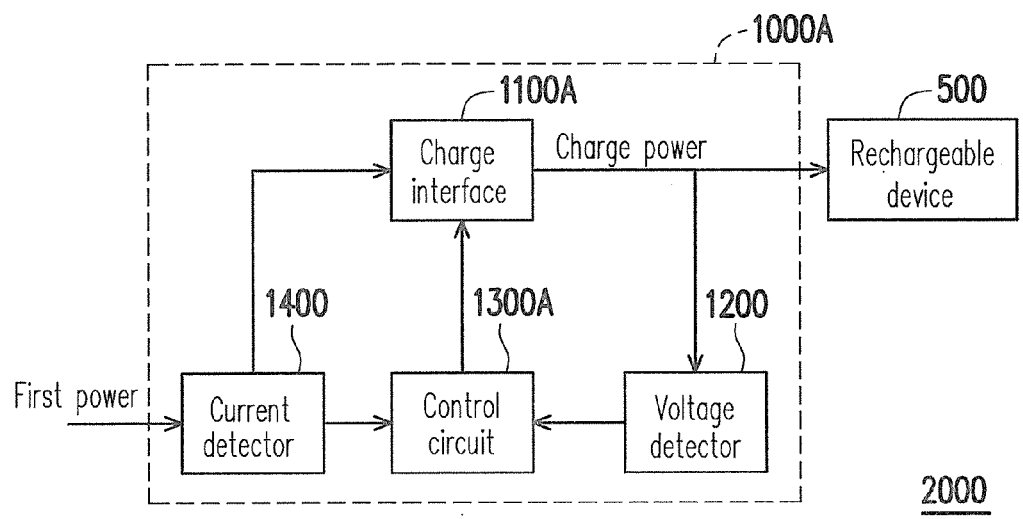
FIG. 4 is a block diagram illustrating a charge device according to another embodiment of the invention.

FIG. 4 is a block diagram illustrating a charge device according to another embodiment of the invention. Referring to FIG. 4, the charge device 1000A of FIG. 4 is similar to the charge device 1000 of FIG. 2. Though, compared to the charge device 1000 of FIG. 2, the charge device 1000A further includes a current detector 1400. The current detector 1400 is coupled to the charge interface 1100A and the control circuit 1300A. The current detector 1400 detects a first current of a first power. The control circuit 1300A adjusts a proportional relationship between the charge voltage and the charge current according to the first current.

In the embodiment of the invention, in accordance with the abnormity and malfunction of the rechargeable device 500, when the voltage detector 1200 detects that the charge voltage is lower than the predetermined voltage, the control circuit 1300A limits the charge current according to the first current. The more the charge voltage decreases under the predetermined voltage, the lower the control circuit 1300A makes the recharge current. Therefore, utilization of the charge device 1000A can avoid the damage or explosion of the rechargeable device 500 caused by overheating. On the other hand, in accordance with the temporary over-discharge of the rechargeable device 500, when the voltage detector 1200 detects that the charge voltage is lower than the predetermined voltage, the control circuit 1300A limits the charge current according to the first current. The charge interface 1100A charges the rechargeable device 500 by using a low current. The charge device 1000A may recover the charge voltage to be greater than the predetermined voltage, and then the rechargeable device 500 is charged by a general charge method. Wherein, the rechargeable device 500 can be a rechargeable battery.

Figure 5:
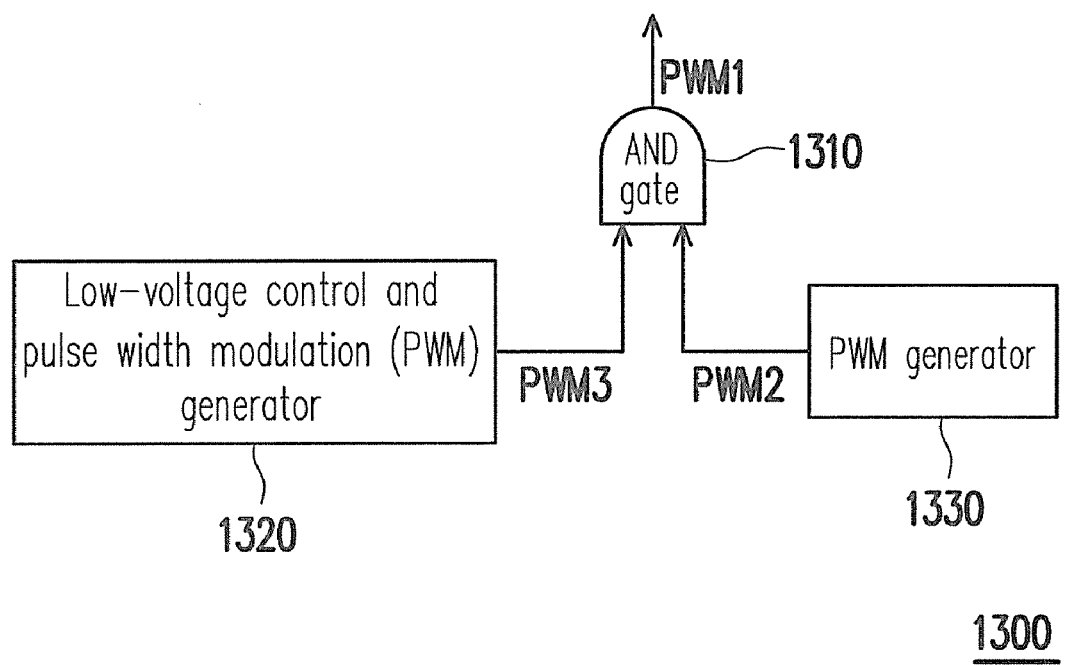
FIG. 5 is a block diagram illustrating a control circuit according to another embodiment of the invention.

FIG. 5 is a block diagram illustrating a control circuit according to another embodiment of the invention. Referring to FIG. 4 and FIG. 5, the control circuit 1300A includes an AND gate 1310, a low-voltage control and pulse width modulation (PWM) generator 1320, and a PWM generator 1330. The AND gate 1310 is coupled to the charge interface 1100A, and outputs a first PWM signal PWM1 to the charge interface 1100A according to a second PWM signal PWM2 and a third PWM signal PWM3. The low-voltage control and PWM generator 1320 is coupled to the AND gate 1310 and the voltage detector 1200, and decreases a duty cycle of the third PWM signal PWM3 when the charge voltage is smaller than the predetermined voltage. The PWM generator 1330 is coupled to the AND gate 1310, the current detector 1400 and the voltage detector 1200, and adjusts a duty cycle of the second PWM signal PWM2 according to the charge voltage and the first current, so as to control the charge interface 1100A.

Figure 6:
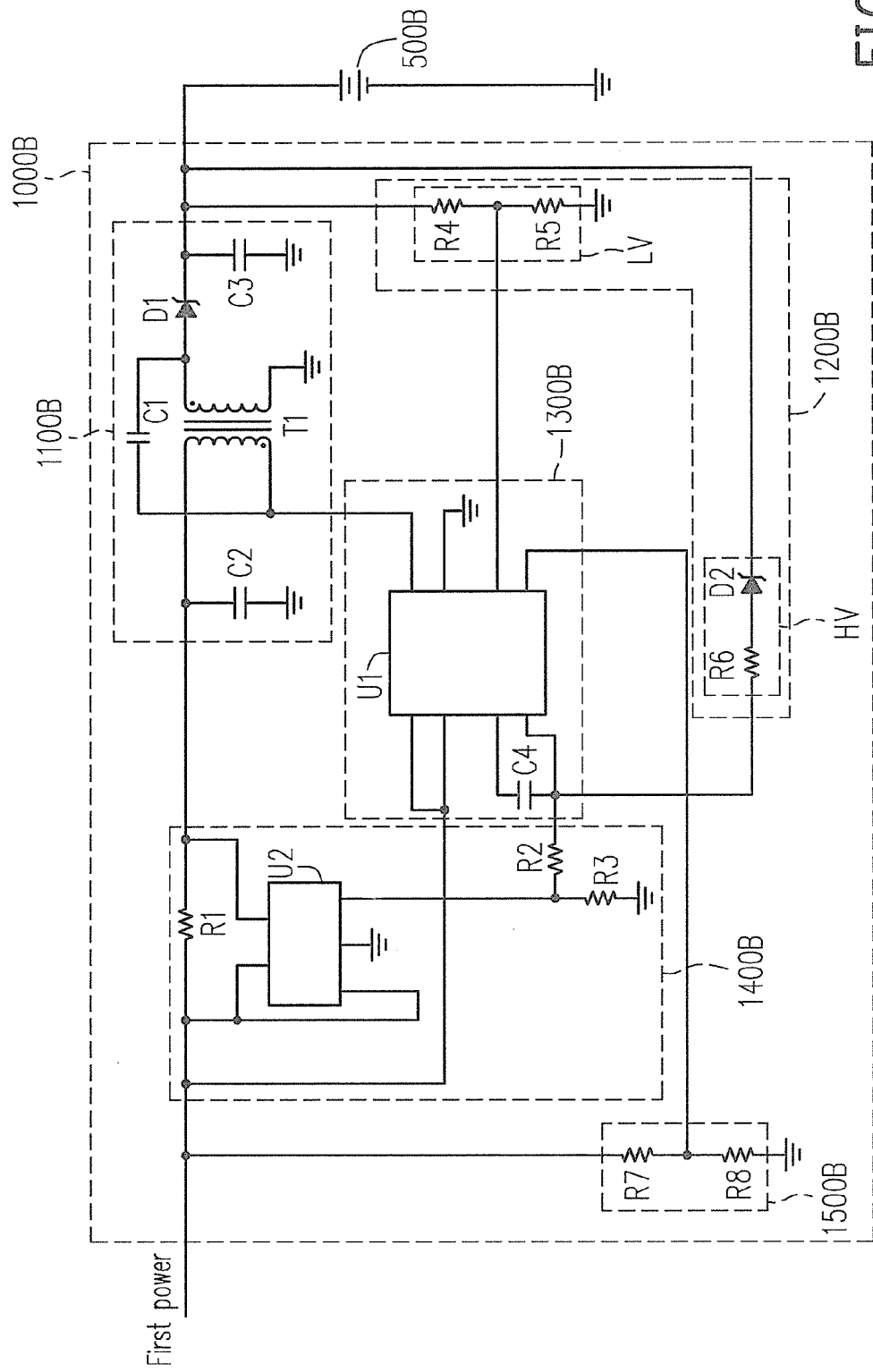
FIG. 6 is a circuit diagram illustrating a charge device according to an embodiment of the invention.

FIG. 6 is a circuit diagram illustrating a charge device according to an embodiment of the invention. Referring to FIG. 6, the charge device 1000B includes a charge interface 1100B, a voltage detector 1200B, a control circuit 1300B, a current detector 1400B and a voltage protection module 1500B. The voltage protection module 1500B detects whether the first power exceeds a design specification. If the voltage protection module 1500B detects that the first power exceeds the design specification, the control circuit 1300B turns off the charge device 1000B.

The charge interface 1100B includes a transformer T1, a first capacitor C1, a second capacitor C2, a third capacitor C3 and a first Schottky diode D1. A first terminal of the transformer T1 is coupled to ground, a second terminal of the transformer T1 is coupled to a first end of the first capacitor C1 and a first end of the first Schottky diode D1, a second end of the first capacitor C1 is coupled to a fourth terminal of the transformer T1, a third terminal of the transformer T1 is coupled to a first end of the second capacitor C2, a second end of the second capacitor C2 is coupled to ground, a second end of the first Schottky diode D1 is coupled to a first end of the third capacitor C3, a second end of the third capacitor C3 is coupled to ground, and the first end of the third capacitor C3 is coupled to a first terminal of a rechargeable device 500B.

The current detector 1400B includes a current detecting module U2, a first resistor R1, a second resistor R2 and a third resistor R3. The first resistor R1 is coupled to a third terminal and a fourth terminal of the current detecting module U2, a first end of the second resistor R2 is coupled to a first terminal of the current detecting module U2, a first end of the third resistor R3 is coupled to the first terminal of the current detecting module U2, a second end of the third resistor R3 coupled to ground, a second terminal of the current detecting module U2 is coupled to ground, the third terminal of the current detecting module U2 is coupled to a fifth terminal of the current detecting module U2, the fourth terminal of the current detecting module U2 is coupled to the first end of the second capacitor C2, and the fifth terminal of the current detecting module U2 receives the first power.

The control circuit 1300B includes a control module U1 and a fourth capacitor C4. A first terminal and a second terminal of the control module U1 are respectively coupled to the fifth terminal of the current detecting module U2. The fourth capacitor C4 is coupled to a third terminal and a fourth terminal of the control module U1, the fourth terminal of the control module U1 is coupled to the second end of the second resistor R2, a seventh terminal of the control module U1 is coupled to ground, and an eighth terminal of the control module U1 is coupled to the fourth terminal of the transformer T1.

The voltage detector 1200B includes a low-voltage detecting module LV and a high-voltage detecting module HV. The low-voltage detecting module LV includes a fourth resistor R4 and a fifth resistor R5. A first end of the fourth resistor R4 is coupled to the first terminal of the rechargeable device 500B, a second terminal of the fourth resistor R4 is coupled to a sixth terminal of the control module U1 and a first end of the fifth resistor R5, and a second end of the fifth resistor R5 is coupled to ground. The high-voltage detecting module HV includes a sixth resistor R6 and a first Zener diode D2. A first end of the sixth resistor R6 is coupled to a second end of the fourth capacitor C4, a second end of the sixth resistor R6 is coupled to a first end of the first Zener diode D2, and a second end of the first Zener diode D2 is coupled to the first terminal of the rechargeable device 500B.

The voltage protection module 1500B includes a seventh resistor R7 and an eighth resistor R8. A first end of the seventh resistor R7 is coupled to the fifth terminal of the current detecting module U2, a second end of the seventh resistor R7 is coupled to a fifth terminal of the control module U1 and a first end of the eighth resistor R8, and a second end of the eighth resistor R8 is coupled to ground.

Figure 7:
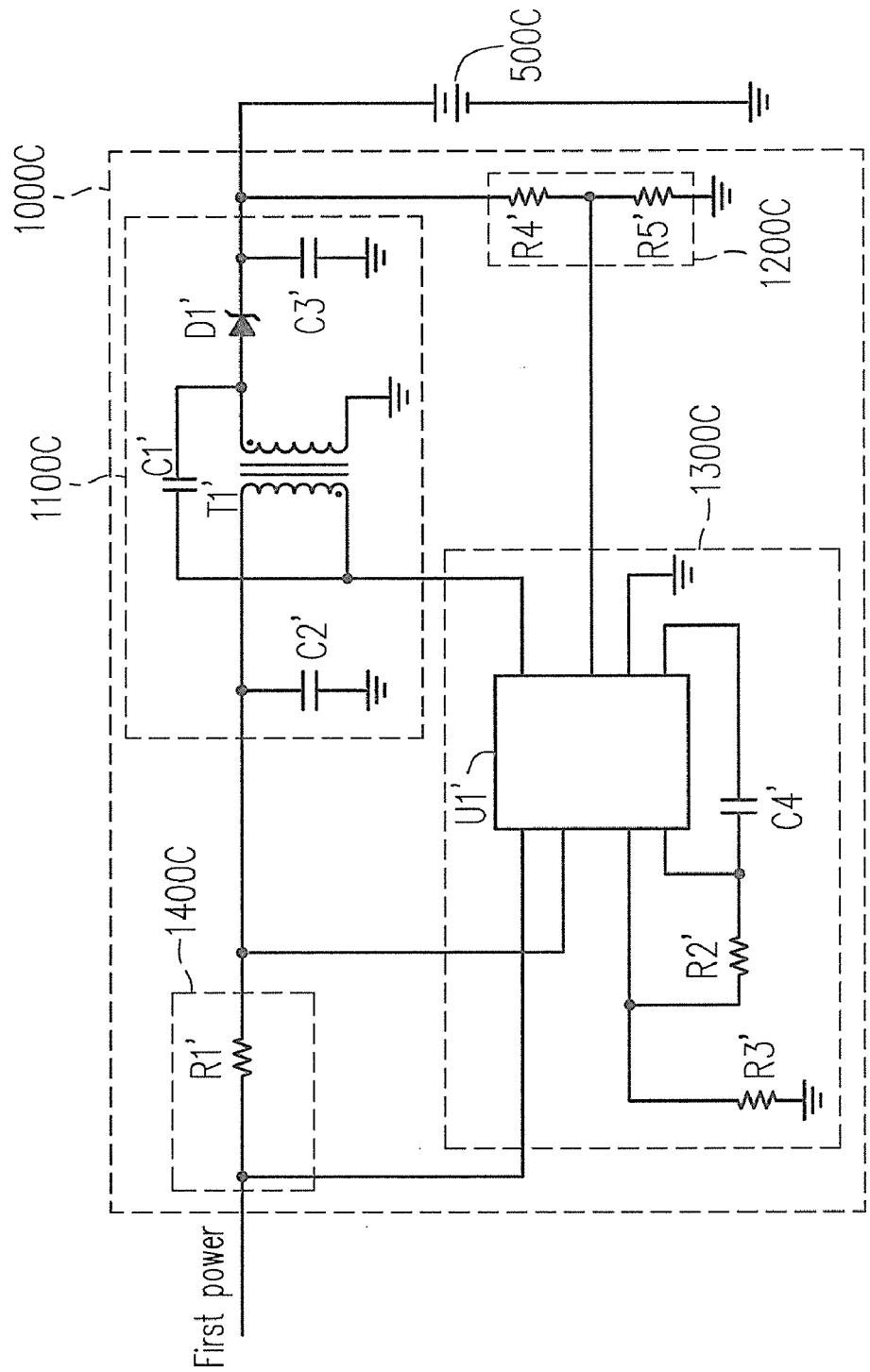
FIG. 7 is a circuit diagram illustrating a charge device according to another embodiment of the invention.

FIG. 7 is a circuit diagram illustrating a charge device according to another embodiment of the invention. Referring to FIG. 7, the charge device 1000C includes a charge interface 1100C, a voltage detector 1200C, a control circuit 1300C, and a current detector 1400C. The charge interface 1100C of FIG. 7 is the same to the charge interface 1100B of FIG. 6, so that detailed description thereof is not repeated.

The current detector 1400C includes a first resistor R1'. A first end of the first resistor R1' is coupled to a first end of a second capacitor C2', and a second end of the first resistor R1' receives the first power.

The control circuit 1300C includes a control module U1', a fourth capacitor C4', a second resistor R2' and a third resistor R3'. A first terminal of the control module U1' is coupled to the second end of the first resistor R1', a second terminal of the control module U1' is coupled to the first end of the first resistor R1'. The fourth capacitor C4' is coupled to a fourth terminal and a fifth terminal of the control module U1'. The second resistor R2' is coupled to a third terminal and the fourth terminal of the control module U1'. A first end of the third resistor R3' is coupled to the third terminal of the control module U1', and a second end of the third resistor R3' is coupled to ground. A sixth terminal of the control module U1' is coupled to ground, and an eighth terminal of the control module U1' is coupled to a fourth terminal of a transformer T1'.

The voltage detector 1200C includes a fourth resistor R4' and a fifth resistor R5'. A first end of the fourth resistor R4' is coupled to a first terminal of the rechargeable device 500C, a second end of the fourth resistor R4' is coupled to a seventh terminal of the control module U1' and a first end of the fifth resistor R5', and a second end of the fifth resistor R5' is coupled to ground. Wherein, the rechargeable device 500C may be a rechargeable battery. The first power may be an alternating current power or a direct current power.

Figure 8:
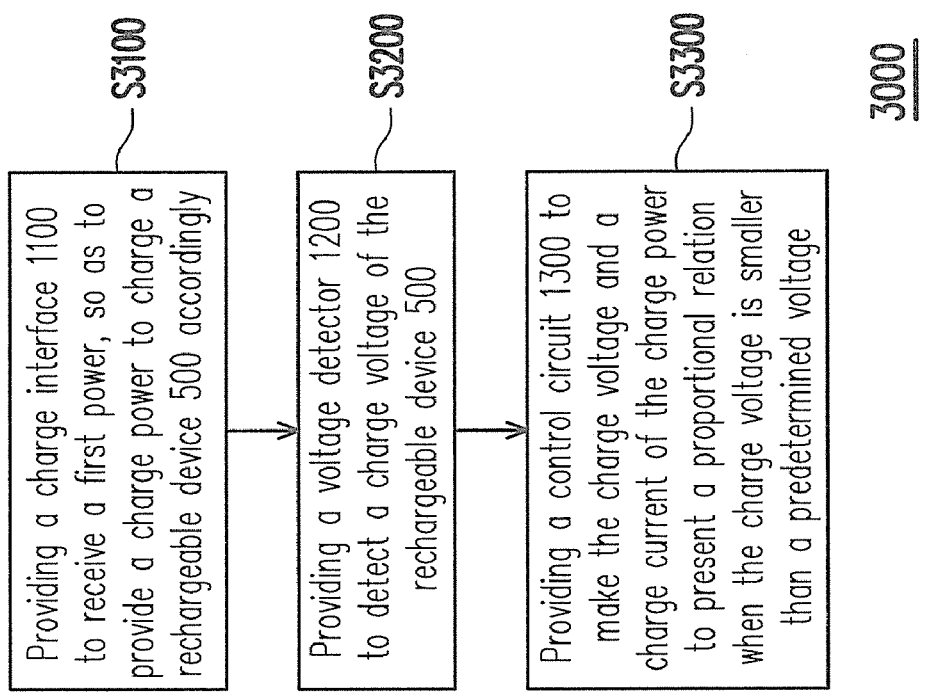
FIG. 8 is a flowchart illustrating a charge method according to an embodiment of the invention.

FIG. 8 is a flowchart illustrating a charge method according to an embodiment of the invention. Referring to FIG. 2 and FIG. 8, the charge method 3000 includes steps S3100-S3300. In the step S3100, a charge interface 1100 is provided to receive a first power, so as to provide a charge power to charge a rechargeable device 500 accordingly. In the step S3200, a voltage detector 1200 is provided to detect a charge voltage of the rechargeable device 500. In the step S3300, a control circuit 1300 is provided to make the charge voltage and a charge current of the charge power to present a proportional relation when the charge voltage is smaller than a predetermined voltage. Moreover, in the charge method 3000, the control circuit 1300 further makes the charge voltage and the charge current to present a piece-wise linear relation.

In summary, in the embodiments of the invention, in accordance with the abnormity and malfunction of the rechargeable device, when the voltage detector detects that the charge voltage is smaller than the predetermined voltage, the control circuit limits the charge current, and the more the charge voltage decreases under the predetermined voltage, the lower the control circuit makes the recharge current. Therefore, utilization of the charge device can avoid the damage or explosion of the rechargeable device caused by overheating. On the other hand, in accordance with the temporary overdischarge of the rechargeable device, when the voltage detector detects that the charge voltage is smaller than the predetermined voltage, the control circuit limits the charge current. The charge interface charges the rechargeable device by using a low current. The charge device may recover the charge voltage to be greater than the predetermined voltage, and then the rechargeable device is charged by a general charge method. In the embodiments of the invention, the electronic device can use the charge device of the invention to charge the rechargeable device, so as to avoid the damage or explosion of the rechargeable device caused by overheating, and complete charging the rechargeable device that is temporarily overdischarged.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A charge device, comprising:
    a charge interface, for receiving a first power and providing a charge power to charge a rechargeable device accordingly;
    a voltage detector, for detecting a charge voltage of the rechargeable device; and
    a control circuit, coupled to the charge interface and the voltage detector and comprising an AND gate, coupled to the charge interface, and outputting a first pulse width modulation (PWM) signal to the charge interface according to a second PWM signal and a third PWM signal, wherein when the charge voltage is smaller than a predetermined voltage, the control circuit makes the charge voltage and a charge current of the charge power to present a proportional relation.

2. The charge device as claimed in claim 1, wherein the control circuit makes the charge voltage and the charge current to present a piece-wise linear relation.

3. The charge device as claimed in claim 1, further comprising a current detector coupled to the charge interface and the control circuit, the current detector detecting a first current of the first power, wherein the control circuit adjusts the proportional relation according to the first current.

4. The charge device as claimed in claim 3, wherein the control circuit comprises:
a low-voltage control and PWM generator, coupled to the AND gate and the voltage detector, and decreasing a duty cycle of the third PWM signal when the charge voltage is smaller than the predetermined voltage; and
a PWM generator, coupled to the AND gate, the current detector and the voltage detector, and adjusting a duty cycle of the second PWM signal according to the charge voltage and the first current.

5. The charge device as claimed in claim 3, wherein the charge interface comprises a transformer, a first capacitor, a second capacitor, a third capacitor and a first Schottky diode, a first terminal of the transformer is coupled to ground, a second terminal of the transformer is coupled to a first end of the first capacitor and a first end of the first Schottky diode, a second end of the first capacitor is coupled to a fourth terminal of the transformer, a third terminal of the transformer is coupled to a first end of the second capacitor, a second end of the second capacitor is coupled to ground, a second end of the first Schottky diode is coupled to a first end of the third capacitor, a second end of the third capacitor is coupled to ground, and the first end of the third capacitor is coupled to a first terminal of the rechargeable device.

6. The charge device as claimed in claim 5, wherein the current detector comprises a current detecting module, a first resistor, a second resistor and a third resistor, the first resistor is coupled to a third terminal and a fourth terminal of the current detecting module, a first end of the second resistor is coupled to a first terminal of the current detecting module, a first end of the third resistor is coupled to the first terminal of the current detecting module, a second end of the third resistor coupled to ground, a second terminal of the current detecting module is coupled to ground, the third terminal of the current detecting module is coupled to a fifth terminal of the current detecting module, the fourth terminal of the current detecting module is coupled to the first end of the second capacitor, and the fifth terminal of the current detecting module receives the first power.

7. The charge device as claimed in claim 6, wherein the control circuit comprises a control module and a fourth capacitor, a first terminal and a second terminal of the control module are coupled to the fifth terminal of the current detecting module, the fourth capacitor is coupled to a third terminal and a fourth terminal of the control module, the fourth terminal of the control module is coupled to the second end of the second resistor, a seventh terminal of the control module is coupled to ground, and an eighth terminal of the control module is coupled to the fourth terminal of the transformer.

8. The charge device as claimed in claim 7, wherein the voltage detector comprises a low-voltage detecting module and a high-voltage detecting module, the low-voltage detecting module comprises a fourth resistor and a fifth resistor, a first end of the fourth resistor is coupled to the first terminal of the rechargeable device, a second terminal of the fourth resistor is coupled to a sixth terminal of the control module and a first end of the fifth resistor, and a second end of the fifth resistor is coupled to ground, the high-voltage detecting module comprises a sixth resistor and a first Zener diode, a first end of the sixth resistor is coupled to a second end of the fourth capacitor, a second end of the sixth resistor is coupled to a first end of the first Zener diode, and a second end of the first Zener diode is coupled to the first terminal of the rechargeable device.

9. The charge device as claimed in claim 8, further comprising a voltage protection module comprising a seventh resistor and an eighth resistor, wherein a first end of the seventh resistor is coupled to the fifth terminal of the current detecting module, a second end of the seventh resistor is coupled to a fifth terminal of the control module and a first end of the eighth resistor, and a second end of the eighth resistor is coupled to ground.

10. The charge device as claimed in claim 5, wherein the current detector comprises a first resistor, a first end of the first resistor is coupled to the first end of the second capacitor, and a second end of the first resistor receives the first power.

11. The charge device as claimed in claim 10, wherein the control circuit comprises a control module, a fourth capacitor, a second resistor and a third resistor, a first terminal of the control module is coupled to the second end of the first resistor, a second terminal of the control module is coupled to the first end of the first resistor, the fourth capacitor is coupled to a fourth terminal and a fifth terminal of the control module, the second resistor is coupled to a third terminal and the fourth terminal of the control module, a first end of the third resistor is coupled to the third terminal of the control module, and a second end of the third resistor is coupled to ground, a seventh terminal of the control module is coupled to ground, and an eighth terminal of the control module is coupled to the fourth terminal of the transformer.

12. The charge device as claimed in claim 11, wherein the voltage detector comprises a fourth resistor and a fifth resistor, a first end of the fourth resistor is coupled to the first terminal of the rechargeable device, a second end of the fourth resistor is coupled to a sixth terminal of the control module and a first end of the fifth resistor, and a second end of the fifth resistor is coupled to ground.

13. The charge device as claimed in claim 1, wherein the first power is an alternating current power or a direct current power.

14. The charge device as claimed in claim 1, wherein the charge interface has a universal serial bus (USB) interface for receiving the first power.

15. The charge device as claimed in claim 1, wherein the rechargeable device is a rechargeable battery.

16. An electronic device, comprising:
a rechargeable device; and
a charge device, comprising:
a charge interface, for receiving a first power and providing a charge power to charge a rechargeable device accordingly;
a voltage detector, for detecting a charge voltage of the rechargeable device; and
a control circuit, coupled to the charge interface and the voltage detector and comprising an AND gate, coupled to the charge interface, and outputting a first pulse width modulation (PWM) signal to the charge interface according to a second PWM signal and a third PWM signal, wherein when the charge voltage is smaller than a predetermined voltage, the control circuit makes the charge voltage and a charge current of the charge power to present a proportional relation.

17. The electronic device as claimed in claim 16, wherein the control circuit makes the charge voltage and the charge current to present a piece-wise linear relation.

18. The electronic device as claimed in claim 16, wherein the charge device further comprises a current detector coupled to the charge interface and the control circuit, the current detector detecting a first current of the first power, wherein the control circuit adjusts the proportional relation according to the first current.

19. The electronic device as claimed in claim 18, wherein the control circuit comprises:
- a low-voltage control and PWM generator, coupled to the AND gate and the voltage detector, and decreasing a duty cycle of the third PWM signal when the charge voltage is smaller than the predetermined voltage; and
- a PWM generator, coupled to the AND gate, the current detector and the voltage detector, and adjusting a duty cycle of the second PWM signal according to the charge voltage and the first current.

20. The electronic device as claimed in claim 18, wherein the charge interface comprises a transformer, a first capacitor, a second capacitor, a third capacitor and a first Schottky diode, a first terminal of the transformer is coupled to ground, a second terminal of the transformer is coupled to a first end of the first capacitor and a first end of the first Schottky diode, a second end of the first capacitor is coupled to a fourth terminal of the transformer, a third terminal of the transformer is coupled to a first end of the second capacitor, a second end of the second capacitor is coupled to ground, a second end of the first Schottky diode is coupled to a first end of the third capacitor, a second end of the third capacitor is coupled to ground, and the first end of the third capacitor is coupled to a first terminal of the rechargeable device.

21. The electronic device as claimed in claim 20, wherein the current detector comprises a first resistor, a first end of the first resistor is coupled to the first end of the second capacitor, and a second end of the first resistor receives the first power.

22. The electronic device as claimed in claim 21, wherein the control circuit comprises a control module and a fourth capacitor, a first terminal and a second terminal of the control module are coupled to a fifth terminal of a current detecting module, the fourth capacitor is coupled to a third terminal and a fourth terminal of the control module, the fourth terminal of the control module is coupled to the second end of the second resistor, a sixth terminal of the control module is coupled to ground, and an eighth terminal of the control module is coupled to the fourth terminal of the transformer.

23. The electronic device as claimed in claim 22, wherein the voltage detector comprises a fourth resistor and a fifth resistor, a first end of the fourth resistor is coupled a first end of the rechargeable device, a second end of the fourth resistor is coupled to a seventh terminal of the control module and a first end of the fifth resistor, and a second end of the fifth resistor is coupled to ground.

24. The electronic device as claimed in claim 23, wherein the control circuit comprises a control module, a fourth capacitor, a second resistor and a third resistor, a first terminal of the control module is coupled to the second end of the first resistor, a second terminal of the control module is coupled to the first end of the first resistor, the fourth capacitor is coupled to a fourth terminal and a fifth terminal of the control module, the second resistor is coupled to a third terminal and the fourth terminal of the control module, a first end of the third resistor is coupled to the third terminal of the control module, and a second end of the third resistor is coupled to ground, a sixth terminal of the control module is coupled to ground, and an eighth terminal of the control module is coupled to the fourth terminal of the transformer.

25. The electronic device as claimed in claim 24, wherein the voltage detector comprises a fourth resistor and a fifth resistor, a first end of the fourth resistor is coupled to the first terminal of the rechargeable device, a second end of the fourth resistor is coupled to a seventh terminal of the control module and a first end of the fifth resistor, and a second end of the fifth resistor is coupled to ground.

26. The electronic device as claimed in claim 16, wherein the first power is an alternating current power or a direct current power.

27. The electronic device as claimed in claim 16, wherein the charge interface has a universal serial bus (USB) interface for receiving the first power.

28. The electronic device as claimed in claim 16, wherein the rechargeable device is a rechargeable battery.

29. A charge method, comprising:
- providing a charge interface to receive a first power, so as to provide a charge power to charge a rechargeable device accordingly;
- providing a voltage detector to detect a charge voltage of the rechargeable device; and
- providing a control circuit by applying an AND logic to output a first pulse width modulation (PWM) signal according to a second PWM signal and a third PWM signal to make the charge voltage and a charge current of the charge power to present a proportional relation when the charge voltage is smaller than a predetermined voltage.

30. The charge method as claimed in claim 29, further comprising making the charge voltage and the charge current to present a piece-wise linear relation through the control circuit.

* * * * *